Patented Aug. 27, 1935

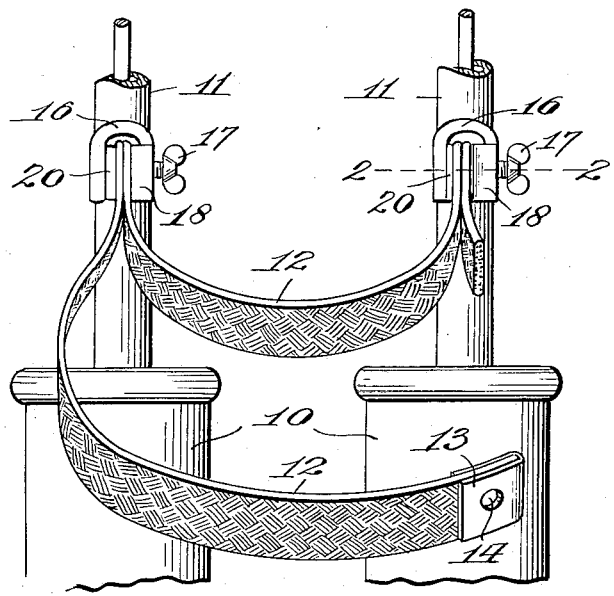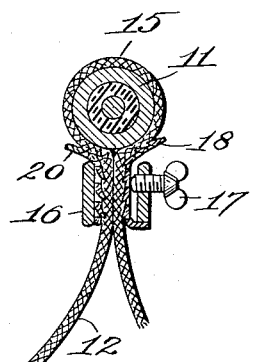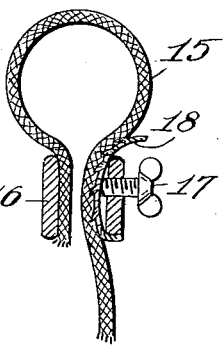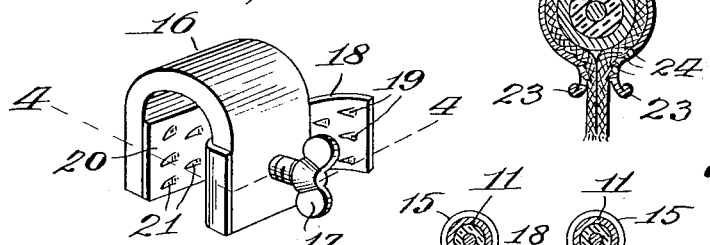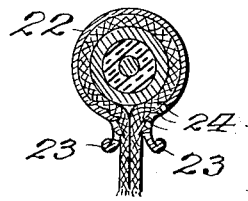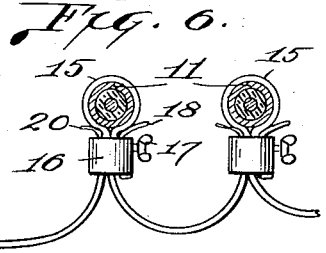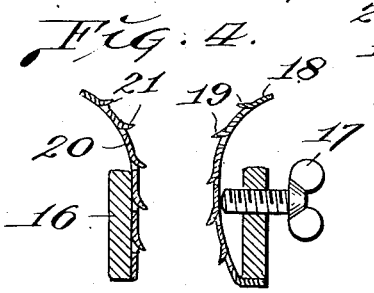

2,012,536

UNITED STATES PATENT OFFICE 2,012,536

CABLE BOND

Herbert G. Honig, Los Angeles, Calif.

Application November 17, 1933, Serial No. 698,488

3 Claims. (Cl. 173—273)

My invention relates to a cable bond that is especially designed for use in connection with the underground cables of street lighting systems and the principal objects of my invention are, to generally improve upon and simplify the construction of the existing forms of cable bonds and to provide a bonding device that is inexpensive of manufacture, capable of being easily and quickly applied to the cables and which will afford practically one hundred percent electrical contact between the bonding strap and the peripheral surfaces of the cable sheaths.

My improved cable bond contemplates the use of a braided copper wire strap having portions that encircle the cables and said strap being engaged immediately adjacent to the cables by clamping means which when tightened on the strap draws the same into intimate contact with the cables so as to provide an extremely effective bond and electric connection between said cables.

My improved cable bond is particularly designed for use upon cables at or near the points where the same emerge from the underground conduits and enter the base portions of the hollow post or standard that forms a part of the lighting fixture.

With the foregoing and other objects in view my invention consists in certain novel features of construction and arrangements of parts that will be hereinafter more fully described and claimed and illustrated in the accompanying drawing in which:

Fig. 1 is an elevational view showing my improved cable bond applied to a pair of cables adjacent to the point where the same emerge from the underground conduits.

Fig. 2 is a horizontal section, slightly enlarged, and taken on the line 2—2 of Fig. 1.

Fig. 3 is a perspective view of the clamp that is utilized for securing the bonding strap to the cable.

Fig. 4 is a horizontal section taken on the line 4—4 of Fig. 3.

Fig. 5 is a horizontal section showing a modified form of the clamp and bonding strap.

Fig. 6 is a plan view partly in section and showing a plurality of cables connected by my improved bond.

Fig. 7 is a horizontal section showing a modified form of the clamp that secures the bonding strap to the cable.

Referring by numerals to the accompanying drawing which illustrates a preferred embodiment of my invention, 10, 10 designates the terminal portions of a pair of underground conduits of the type generally used in street lighting systems, said terminal portions being brought up through the concrete surface of the street or sidewalk within the hollow post or standard of the lighting fixture.

Each conduit contains one or more lead sheathed cables 11 and my improved bond is usually applied to the cables adjacent to the points where the same emerge from the conduits.

As a bonding element between the cables 11, I prefer to use a flexible strap 12 formed of braided metal wire, preferably copper, and this bonding strap is of sufficient length to provide a connection between the two cables 11 and one or both ends of the strap may be extended for connection to a part of the lighting system.

In Fig. 1 I have shown one end of the bonding strap provided with a metal clip 13 and which clip is perforated as designated by 14 for the reception of an attaching screw.

The same result may be attained by dipping the end of the bonding strap in solder and then perforating the dipped end portion.

Portions of the bonding strap are bent to form circular loops 15 that encircle the cables 11 and from the ends of the loop the portions of the cable are pressed together so as to lie parallel and in direct contact with each other.

The clamps utilized for securing the bonding strap to the cables and to maintain the loops 15 in intimate contact with said cables, comprise inverted U-shaped members 16 of metal and seated in one leg of each clamp, is a screw 17, preferably of the type having a winged head so that said screws may be conveniently manipulated by the thumb and fingers.

Suitably secured to the front edge of the leg of the clamp that carries the screw 17, is one end of a flat spring 18 of resilient metal that extends rearwardly through the clamp adjacent to the leg that carries the screw 17 and the rear end of this spring is curved outward as illustrated in Figs. 3 and 4.

Formed integral with or pressed from this spring 18 are small pointed prongs 19 which are inclined slightly and which project from the face of said spring on the opposite side from the face that is engaged by screw 17.

Suitably secured to the inner face of the opposite leg of the clamp 16, is a flat spring 20 of resilient metal, the rear end of which is curved outwardly away from the curved end of prong 18 and projecting from the face of this spring 20 is a series of small inclined pointed prongs 21.

In applying the clamp to those portions of the strap immediately adjacent to the loop 15, screw 17 is backed off to permit spring 18 to flex toward the leg to which it is attached and the clamp is positioned upon those parallel portions of the strap immediately adjacent to the loop 15.

The clamp is forced toward the looped portion of the strap that surrounds the cable and at the same time those portions of the strap that project through the clamp are forcibly drawn outward so that practically all portions of the inner surface of the loop 15 are in direct contact with the cable.

This action causes the prongs 19 and 21 on the springs 18 and 20 to engage the surfaces of the strap and screw 17 is now screwed inwardly through the leg of the clamp through which it is seated so as to narrow the space between the springs and thereby firmly grip and clamp the interposed portions of the strap.

As the spring 18 is moved inward by the screw, both springs will flex so as to conform to the curvature of the engaged surfaces of the strap, particularly in the bent portions between the loop 15 and the parallel portions of the strap between the springs, with the result that the loop will be drawn tightly around the cable so as to make direct contact with practically one hundred precent of the peripheral surface of the cable.

It will be noted that the free ends of both springs 18 and 20 project a short distance beyond one end of member 16 and as a result of this arrangement, the free resilient ends of said springs hug with considerable pressure, directly against the surfaces of the looped portion 15 of the strap adjacent to the parallel portions that pass between the springs and thus constant tension is applied to the end portions of the loop which tends to more firmly clamp the strap to the cable and provide a perfect electrical connection.

To remove the clamp from the bonding strap it is only necessary to back off screw 17 a sufficient degree to permit the spring 18 to move away from spring 20 to such a degree as to disengage the prongs from the surfaces of the bonding strap.

In Fig. 5 I have illustrated a modified construction wherein the spring 20 is eliminated and one end of the bonding strap is secured by suitable means directly to the leg of the clamp 16 opposite the leg that carries the screw 17 and spring plate 18.

In Fig. 6 I have shown a bonding strap connected to a series of cables by my improved clamping means.

In Fig. 7 I have shown a modified construction wherein the clamp takes the form of an open ring 22 formed of flat resilient metal, the end portions of which are extended to form short ears 23 that are curved outward.

Projecting from the inner faces of these ears and from the adjacent inner faces of the body of the ring or loop 22, are small pointed prongs 24.

This form of clamp is applied to the looped portion of the bonding strap that surrounds the cable by spreading the end portions of the ring or loop apart so as to permit insertion of the cable and the surrounding loop of the bonding strap and when the open ring closes as a result of the resiliency in the metal from which it is formed, the prongs 24 engage the outer surfaces of the loop and strap and clamp the same firmly to the cable.

Thus it will be seen that I have provided a cable bond that is relatively simple in construction, inexpensive of manufacture, capable of being easily and quickly applied to or removed from the bonding strap and which is very effective in performing the functions for which it is intended.

It will be understood that minor changes in the size, form, and construction of the various parts of my improved cable bond may be made and substituted for those herein shown and described without departing from the spirit of the invention, the scope of which is set forth in the appended claims.

I claim as my invention:

1. In a cable bond, a clamp comprising a U-shaped member, resilient plates secured to the legs of said member adjacent the edges on one side thereof and extending between said legs transversely to the longitudinal axes of said legs, the free ends of which springs terminate in a plane a substantial distance away from the side of said U-shaped member and means carried by one of the legs of said member for exerting pressure against one of said springs.

2. In a cable bond, a U-shaped member, resilient plates secured to the legs of said member and extending between said legs, transversely to the longitudinal axes of said legs, the free ends of which resilient plates terminate at points a substantial distance outwardly from the side of said U-shaped member, prongs projecting from the adjacent faces of said resilient plates and means carried by one of the legs of said member for exerting pressure against one of said resilient plates.

3. In a cable bond, a U-shaped member, resilient plates arranged on the inner faces of the legs of said member and projecting between said legs transversely to the longitudinal axes thereof, the free ends of which resilient plates diverge, prongs projecting from the adjacent faces of said resilient plates and means on said member for applying pressure to one of said resilient plates.

HERBERT G. HONIG.